United States Patent
Ebert et al.

(10) Patent No.: US 10,196,274 B2
(45) Date of Patent: Feb. 5, 2019

(54) POROUS $SiO_2$-XEROGEL WITH A CHARACTERISTIC PORE SIZE, STABLE DRYING PRECURSORS THEREOF AND USE OF SAME

(75) Inventors: Hans-Peter Ebert, Dettelbach (DE); Theresa Noisser, Würzburg (DE); Gudrun Reichenauer, Gerbrunn (DE); Lena Weigold, Würzburg (DE)

(73) Assignees: BSH Hausgeräte GmbH, Munich (DE); Bayerisches Zentrum für Angewandte Energieforschung e. V., Würzburg (DE)

( * ) Notice: Subject to any disclaimer, the term of this patent is extended or adjusted under 35 U.S.C. 154(b) by 0 days.

(21) Appl. No.: 13/510,731

(22) PCT Filed: Nov. 19, 2010

(86) PCT No.: PCT/EP2010/067821
§ 371 (c)(1),
(2), (4) Date: May 31, 2012

(87) PCT Pub. No.: WO2011/061289
PCT Pub. Date: May 26, 2011

(65) Prior Publication Data
US 2012/0238445 A1 Sep. 20, 2012

(30) Foreign Application Priority Data
Nov. 19, 2009 (DE) .................. 10 2009 053 782

(51) Int. Cl.
*C01B 33/16* (2006.01)
*C01B 33/14* (2006.01)

(52) U.S. Cl.
CPC ............ *C01B 33/163* (2013.01); *C01B 33/14* (2013.01); *C01B 33/16* (2013.01)

(58) Field of Classification Search
CPC ..... C01B 33/16; C01B 33/158; C01B 33/163; C08J 9/26; C08J 9/28
(Continued)

(56) References Cited

U.S. PATENT DOCUMENTS 5,647,962 A   7/1997 Jansen et al.
5,888,425 A   3/1999 Schwertfeger et al.
(Continued)

FOREIGN PATENT DOCUMENTS

DE   19721600 A1   11/1998
WO   9805591 A1   2/1998
WO   2005068361 A2   7/2005

OTHER PUBLICATIONS

International Search Report PCT/EP2010/067821.

*Primary Examiner* — Matthew E. Hoban
*Assistant Examiner* — James A Fiorito
(74) *Attorney, Agent, or Firm* — Michael E. Tschupp; Andre Pallapies; Brandon G. Braun

(57) ABSTRACT

A porous SiO2 xerogel is produced using temporary pore fillers or solid skeletal supports, which are removed by thermal oxidation at the end of the production process (e.g. carbon or organic), by means of a sol-gel-process by subcritical drying of the gel. The $SiO_2$ xerogel includes pores having a pore size from more than 50 nm to less than 1000 nm. The $SiO_2$ xerogel has a density of less than 400 kg/m³, a carbon content of less than 10%, a thermal conductivity at 800° C. below 0.060 W/m*K, a thermal conductivity at 400° C. below 0.040 W/m*K, and a thermal conductivity at 200° C. below 0.030 W/m*K.

14 Claims, 3 Drawing Sheets

(58) Field of Classification Search
USPC .................. 423/338; 516/34, 77, 98, 111
See application file for complete search history.

(56) References Cited

U.S. PATENT DOCUMENTS

| | | |
|---|---|---|
| 6,040,375 A | 3/2000 | Behme et al. |
| 2006/0069171 A1* | 3/2006 | Prokopowicz et al. ........ 521/61 |
| 2008/0188575 A1* | 8/2008 | Gaspar Martinho et al. ............... 516/111 |
| 2009/0205737 A1* | 8/2009 | Dinon et al. .................. 138/149 |
| 2012/0228545 A1* | 9/2012 | Ebert et al. .............. 252/182.32 |

* cited by examiner

POROUS SiO₂-XEROGEL WITH A CHARACTERISTIC PORE SIZE, STABLE DRYING PRECURSORS THEREOF AND USE OF SAME

BACKGROUND OF THE INVENTION

This invention relates to a porous $SiO_2$ xerogel with a characteristic pore size of less than 1 micrometer, which is produced using temporary pore fillers or solid skeletal supports, which are removed by thermal oxidation at the end of the production process (for example carbon or organic), by means of a sol-gel process with subcritical drying of the gel. The additional organic particles, or macromolecules, or the carbon particles in the inorganic gel prevent a collapse of the inorganic network during the subcritical drying process. These pore fillers or solid skeletal supports are subsequently oxidatively removed as far as possible by heat treatment in excess of 300° C. The result is a $SiO_2$ xerogel (having a fiber content of <5% by weight) with a porosity >80%, a carbon content of less than 10%, which is not or is only weakly chemically bound to the silicate structure, and pores in the range of less than 1 micrometer.

Aerogels, cryogels and xerogels are used in many areas. The aforementioned materials are basically differentiated by the type of drying method. Aerogel is a generic term for all gels having a low solids content, the pores of which are filled with air, but in a narrower sense they are also defined by a supercritical drying process, cryogels by freeze drying and xerogels by convective subcritical drying.

With regard to the present aerogel according to the invention, this is therefore strictly speaking a xerogel throughout.

As a result of their extremely low densities and their high porosities of typically 85% and greater, silica aerogels are excellent insulating materials which in contrast to organic materials can also be used at high temperatures. In the case of non-evacuated materials, above 250° C. organic components would combust with the oxygen present in the air.

The production of highly porous solids by means of sol-gel methods normally requires a supercritical drying step in order to obtain the pore structure. This drying is on the one hand demanding in terms of time and resources because as a general rule the solvent in the pores first needs to be exchanged. On the other hand, it is energy intensive because autoclaves operate at high pressure. Processing in an autoclave is also disadvantageous from the process engineering viewpoint on account of its non-continuous nature (batch processing). Due to the great capillary forces occurring, convective drying at 1 bar (subcritical drying) results in the collapse of the pore structure, which is why monolithic materials having a high porosity can only be produced with difficulty. This means that xerogels exhibit higher densities and therefore also inferior thermal insulation properties compared with aerogels.

The aerogel produced in [WO2005068361] must be dried supercritically and is thus expensive and complex to produce.

In order to avoid the supercritical drying and nevertheless achieve low densities there are several general approaches. Einarsrud et al. have developed a method which reduces the shrinkage occurring during subcritical drying through a stiffening of the gel structure in the wet gel [Einarsrud, M. A., E. Nilsen, A. Rigacci, G. M. Pajonk, S. Buathier, D. Valette, M. Durant, B. Chevalier, P. Nitz, and F. Ehrburger-Dolle, *Strengthening of silica gels and aerogels by washing and aging processes*. Journal of Non-Crystalline Solids, 285 (2001) 1-7]. However, in spite of the low density of the resulting xerogel the solid-body heat conduction is increased when using this method because locally the contacts between the silica particles in the gel structure are systematically increased.

A further disadvantage are the additionally required method steps which comprise two time-consuming solvent exchange steps and the long times which are required for crack-free drying of macroscopic molded bodies.

In order to prevent a cross-linking of the surface hydroxy groups (in the case of compression of the gel by the capillary forces) during drying and thus an irreversible shrinkage, these groups can be converted using a silylating agent as in [EP0690023A2], WO9805591A1 or WO96022942A1. This method does however always signify a further protracted solvent exchange and a further synthesis step and does not prevent the large temporary shrinkage of the sample during the subcritical drying which particularly in the case of molded bodies having dimensions in the cm range and greater can easily result in the formation of cracks or requires very slow drying. These silylated hydrophobized gels cannot be used with application temperatures in excess of 250° C. because otherwise the organic surface groups are destroyed and the desired effect, such as for example the hydrophobia in the case of WO9805591A1, is thus also destroyed.

BRIEF SUMMARY OF THE INVENTION

The object of the invention is a porous $SiO_2$ xerogel which both exhibits the low density of an aerogel and thus also has a correspondingly low thermal conductivity, and also can be used at temperatures in excess of 300° C., and which exhibits a good mechanical stability (modulus of elasticity greater than 5 MPa). Production takes place by means of subcritical drying.

In order to achieve a low density and a low thermal conductivity in the case of xerogels, in other words subcritically dried gels, according to the invention there are two approaches to solving the implementation of a stable drying intermediate product or a stable drying precursor.

DETAILED DESCRIPTION OF EXEMPLARY EMBODIMENTS OF THE PRESENT INVENTION

The first approach to a solution provides a $SiO_2$ xerogel having pores partially filled with an organic or a carbon component. A component which has an ash content of less than 20% by weight is referred to in the following as an organic component. In order to mechanically support the structure formed by the sol-gel process during the drying, organic parts or carbon components are incorporated into the gel which fill a portion of the pores formed in the sol-gel process and thereby mechanically prevent or reduce a contraction of the gel structure during drying. The inorganic network (1) with the organic or carbon components as a pore filler (2) is shown schematically in FIG. 1. In this situation, the particle size must be in the range less than the maximum permissible pore size.

The second approach to a solution is effected by way of a $SiO_2$ xerogel having spheroidal organic components which are incorporated chemically into the $SiO_2$ network. In order to withstand the capillary pressure during drying and thus to counteract a collapse of the network or an irreversible shrinkage, organic spheroidal components are required as a mechanical support in the solid skeleton (FIGS. 1 and 2; left).

Figure 1:
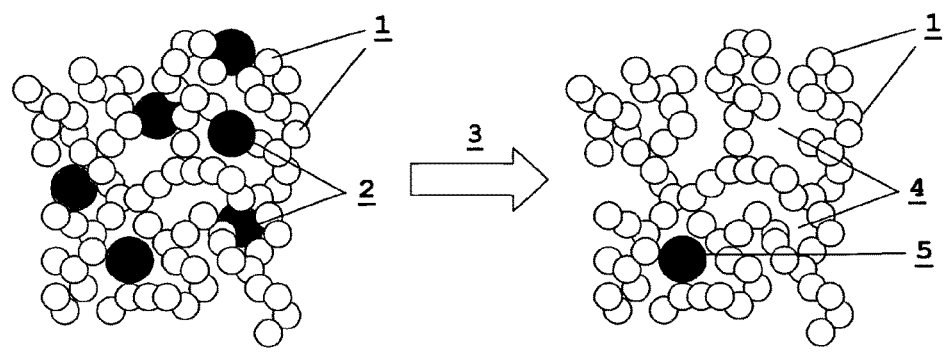
FIG. 1 shows on the left-hand side a $SiO_2$ network before oxidation and on the right-hand side the $SiO_2$ network after oxidation.
Figure 2:
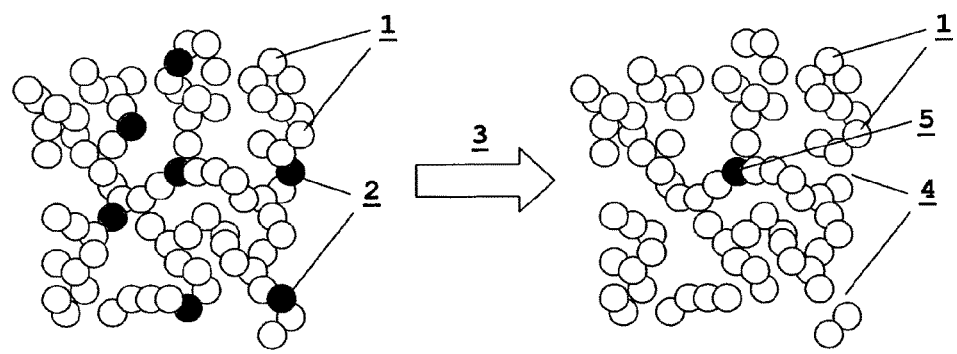
FIG. 2 shows on the left-hand side another $SiO_2$ network before oxidation and on the right-hand side the $SiO_2$ network after oxidation.

By means of a following oxidation step (3), in the first approach these organic or carbon components are removed as far as possible from the pores or in the second approach from the solid skeleton (FIGS. 1 and 2; right). This is shown schematically in FIG. 1 (right) for the case of the partially filled pores and in FIG. 2 (right) for the components integrated into the organic network; imperfections or pores formed as a result of oxidation are identified by (4), residual non-silicate components due to non-removal by oxidation are identified in each case by (5).

Aerogels consist of three-dimensionally networked chains of spheroidal primary particles in the nanometer range. The overall thermal conductivity in silica aerogels is determined by three factors: gas, radiant and solid-body heat conduction. Since silica aerogels are almost completely transparent to IR radiation, the transfer of heat by radiation should not be disregarded for them particularly at higher temperatures ($\sim T^3$). This contribution can be sufficiently reduced through the addition or integration of opacifying agents (=pigments) or through the use of boundaries with a low radiation emission (low-e boundaries). Aerogels and xerogels generally exhibit a high optical transparency. For applications which require no optical transmittance, such as opaque insulation materials, it is possible to dispense specifically with the optical transparency; the incorporation of components which reduce the transmittance of the material in the infrared wavelength range and thereby also lessen the heat transport by radiation also results as a general rule in an optical dimming of the material due to absorption or diffusion. In order that the radiation transport is effectively suppressed, according to the invention xerogels also having a low transparency in the visible spectral range are preferred.

The contribution of the gas heat conduction is created by heat transfer occurring during collisions between gas molecules in the pores. With pore diameters of less than 1 micrometer this contribution can be greatly reduced because the probability of collisions between the gas molecules decreases as the pore size decreases. As the pore size decreases, for a given density of the gel structure the shrinkage of the sample occurring during the subcritical drying and thereby also the density of the resulting xerogel increases as a result of capillary forces. The greater density of the material increases the contribution of the solid-body conduction. The aim therefore is to generate pore sizes in the material smaller than 1000 nm, as far as possible even smaller than 300 nm, and to achieve a xerogel of sufficiently low density (less than 400 kg/m$^3$) in spite of subcritical drying and dispensing with solvent exchange. In order to withstand the capillary pressure during the subcritical drying and thus to counteract a collapse of the network or an irreversible shrinkage, according to the invention an organic or carbon-containing spheroidal component is required as a mechanical support in at least 10% of the pores or an organic or carbon-containing spheroidal component is incorporated into the solid skeleton.

The present invention relates to a xerogel which is produced from a silicate compound, for example a silicon alkoxide (for example TMOS or TEOS) or sodium silicate in an acid or base medium, and to which are added in the starting solution, the sol phase or after commencement of gelification (for a pore-filled xerogel) appropriate organic or carbon constituents, based for example on hydrocarbons, epoxides, amines, polyesters, polyimides, polyurethanes, biopolymers such as for example proteins or polysaccharides (flour, rice starch, molasses, sugar beet molasses), bacteria (for example lactic acid bacteria) or carbon blacks (carbon black, conductive carbon black, filler carbon black), carbon nanotubes, fullerenes, graphite powders, or for a xerogel having solid skeletal support appropriate organic constituents, such as for example organic macromolecules (for example hydrocarbons, epoxides, amines, polyesters, polyimides, polyurethanes, proteins). An even distribution of the constituents throughout all the material is ensured by the choice of non-aggregating particles having good dispersibility or molecules having good solubility or specific dispersing aids such as for example by means of ultrasound treatment or fragmentation [Tillotson, T. M., Hrubesh, L. W., Simpson, R. L., Lee, R. S., Swansiger, R. W., Simpson, L. R. *Sol-gel processing of energetic materials*. Journal of Non-Crystalline Solids, 1998. 225(1), 358-363]. With regard to long gelification times for the inorganic network, a homogeneous distribution of fine-particle organic or carbon particles can be achieved by initially allowing the formation of an inorganic network which is however partially destroyed by ultrasound treatment or fragmentation. With regard to the incorporation of monomers, the educts are chosen such that a good solubility is ensured. This happens either through the suitable choice of the monomers or by employing linker groups in order to link the synthesized polymer covalently to the network. This is achieved according to the invention by the fact that the surface of the silica sol particles is provided in situ with appropriate functional groups. If the modified organic particles are converted with a simple silica precursor such as for example TEOS or TMOS, in the case of pore-filled xerogels corresponding chains consisting of primary particles are formed around the organic particles, with regard to the xerogels having solid skeletal support these are incorporated into the $SiO_2$ network, the stability of the gel structure is ensured by means of additional organic/inorganic networking.

Both the pore-filled xerogel and also the xerogel having solid skeletal support can be produced either by using a bottom-up method or a top-down method. "Top-down" generally denotes the route for producing the desired particle size of the organic or carbon component from solids or powders by comminution. With regard to the methods described here, this means incorporating available solid particles into the material. With regard to "bottom-up" methods, these are based on molecular precursors and the desired particles are constructed in situ.

With regard to the pore-filled xerogel and the production thereof using the top-down method, during the gelification the $SiO_2$ network (1) is formed around the organic particles (2) without incorporating these into the network. These spheroidal particles (2) are therefore chemically linked weakly at the very most to the network (1).

With regard to the pore-filled xerogel and the production thereof using the bottom-up method, an organic spheroidal polymer (2) is constructed in situ in the starting solution (for example by means of cogelification and/or phase separation) which is chemically embedded weakly at the very most in the pores and partially supports the inorganic network (1) during the drying.

With regard to the xerogel having solid skeletal support and the production thereof using the top-down method, during the gelification of the $SiO_2$ network (1) organic particles (2) are incorporated. These spheroidal particles (2) are therefore integrated directly into network (1) where they are chemically linked.

With regard to the xerogel having solid skeletal support and the production thereof using the bottom-up method, an organic spheroidal polymer (2) is constructed in the starting solution which is incorporated into the $SiO_2$ network (1) during the formation thereof. Alternatively, it is also possible to initially allow a sol-gel transition, then mechanically (for example using ultrasound or a shredder) partially destroy the wet gel network formed and initiate a chemical networking with the $SiO_2$ network through the addition of the organic component by way of functional groups. These spheroidal particles (2) are therefore integrated directly into the network (1) where they are chemically linked.

These spheroidal organic or carbon particles are used as temporary pore fillers or temporary solid skeletal supports and are burned out (3) after drying of the gel has taken place, as a result whereof additional pores (4) of an adjustable size are exposed in the inorganic network or interruptions arise in the $SiO_2$ network.

With regard to the pore-filled xerogel, after the organic content or the carbon has been burned out corresponding pores (4) develop which result in a reduction in density, and associated therewith a reduction in solid-body conduction.

With regard to the xerogel having solid skeletal support, after the organic content has been burned out corresponding imperfections (4) develop in the solid skeleton which likewise result in a reduction in solid-body conduction and leave behind small pores.

The morphological and physical properties of these two materials produced can hardly be differentiated from one another because although the pores and imperfections are developed from different sources they can definitely lie in the same order of magnitude and thereby result in the same, desired, effect according to the invention. If required, in the case of the pore filler approach, it is possible by way of the size of the organic or carbon component to define a pore size in the xerogel which is clearly different from that which develops as a result of the sol-gel transition of the inorganic gel alone. Bimodal pore radius distributions are present in such xerogels.

Additional pigments can be incorporated both during the sol-gel process and also subsequently into the wet gel.

An inorganic xerogel having pores filled with organic or carbon particles or solid skeletal supports is then present both after the top-down method step and also after the bottom-up method step. The density of this xerogel lies between 150 and 600 kg/m³ and the temporary content by volume of organic or carbon particles is between 10% and 60%.

According to the invention, the xerogel is subjected to a heat treatment in excess of 300° C. In this associated method step, the organic or carbon particles are removed as far as possible from the gel structure.

A carbon residue (5) (<10%) in the material, which in spite of heat treatment cannot be removed from the $SiO_2$ network or specifically remains there, contributes to an IR dimming of the material. This results in a reduction in radiation heat conduction which, particularly at high temperatures, makes a not inconsiderable contribution of for example 30% to 50% at 0° C. up to 90% at 170° C. to the overall thermal conductivity in silica xerogels.

The silica xerogel according to the invention exhibits the following properties: The pore sizes range between 1000 nm and 50 nm, the density ranges between 400 kg/m³ and 100 kg/m³. The determination of the mean size d of the pores is effected from the macroscopic density of the xerogel p and the specific external surface $S_{ext}$. In this situation, $S_{ext}$ is calculated as the difference between the specific surface according to the BET method $S_{BET}$ (ISO 9277:1995 and DIN 66135-2:2001-06) and the specific micropore surface $S_{Mik}$ (ISO15901-3); d is thus given by $d=4\cdot(1/\rho-1/\rho_{SiO2})/S_{ext}$, where $\rho$ is the macroscopic density of the molded body and $\rho_{SiO2}$ is the density of non-porous amorphous $SiO_2$ glass (=2.2 g/cm³). In the case of bimodal pore distributions in which the diameter of a group of pores lies below 100 nm, the pore distribution of the pores <100 nm is determined using BJH analysis of the nitrogen sorption isotherms according to the DIN 66134 (1998-02) Standard; the corresponding mean value is referred to as d". The mean size of the pores >100 nm d' is given by the difference between overall pore volume $V_{P,Gesamt}=(1/\rho-1/\rho_{SiO2})$ and the pore volume $V_{p,<100}$ of the pores smaller than 100 nm which is determined according to the Gurvich rule from the measured isotherms, and also the difference between external surface $S_{ext}$ and the external surface of the pores smaller than 100 nm $$S_{ext,<100}=4*(V_{p,<100})/d'$$

as $$d=4\cdot(V_{P,Gesamt}-V_{p,<100})/(S_{ext}-S_{ext,<100}).$$

In the case of bimodal distributions with pores >100 nm, the distribution is determined with the aid of mercury porosimetry (ISO 15901-1).

The Rosseland mean IR extinction at 300 K is at least 50 m²/g without pigments and at least 80 m²/kg with pigments (spectral averaging interval of 1.4 μm to 35.0 μm). The value is ascertained by determining the direct hemispherical transmission and reflexion in the wavelength range from 1.4 μm to 35.0 μm.

The mechanical stability is characterized by a modulus of elasticity >5 MPa. The modulus of elasticity can be determined either by means of a static method in which the relative change in length $\Delta L/L$ of the sample is determined at unidirectional pressure p:

$$E = \frac{p}{\Delta L/L}$$

Alternatively, the modulus of elasticity can be calculated from the sound velocity v in accordance with $E=v^2\rho$ with the density $\rho$.

Figure 3:
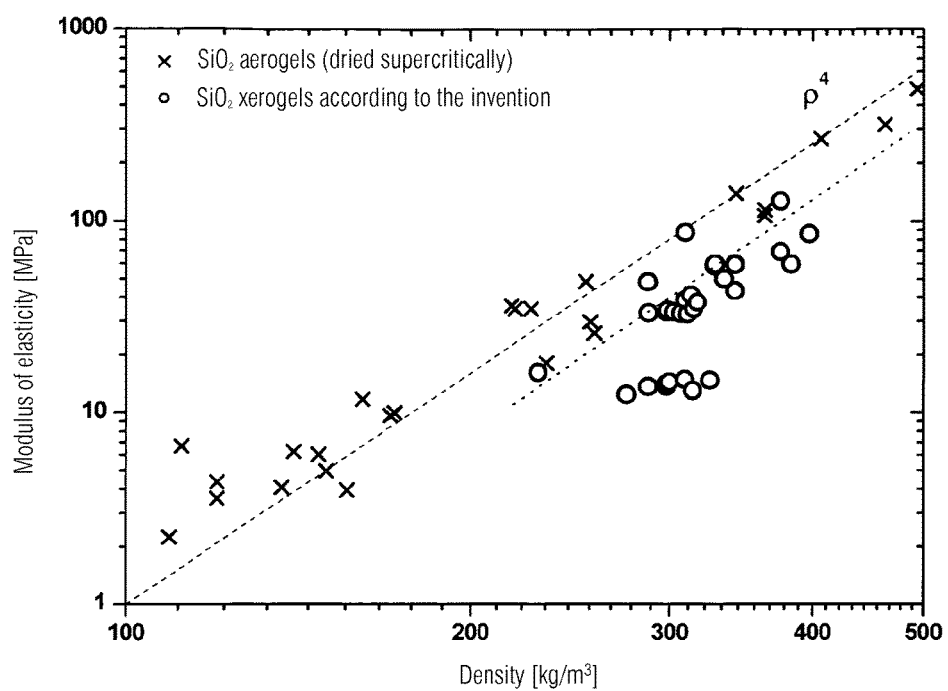
FIG. 3 is a graph showing the relation between modulus of elasticity and density for $SiO_2$ aerogels and $SiO_2$ xerogels according to the invention.
Figure 4:
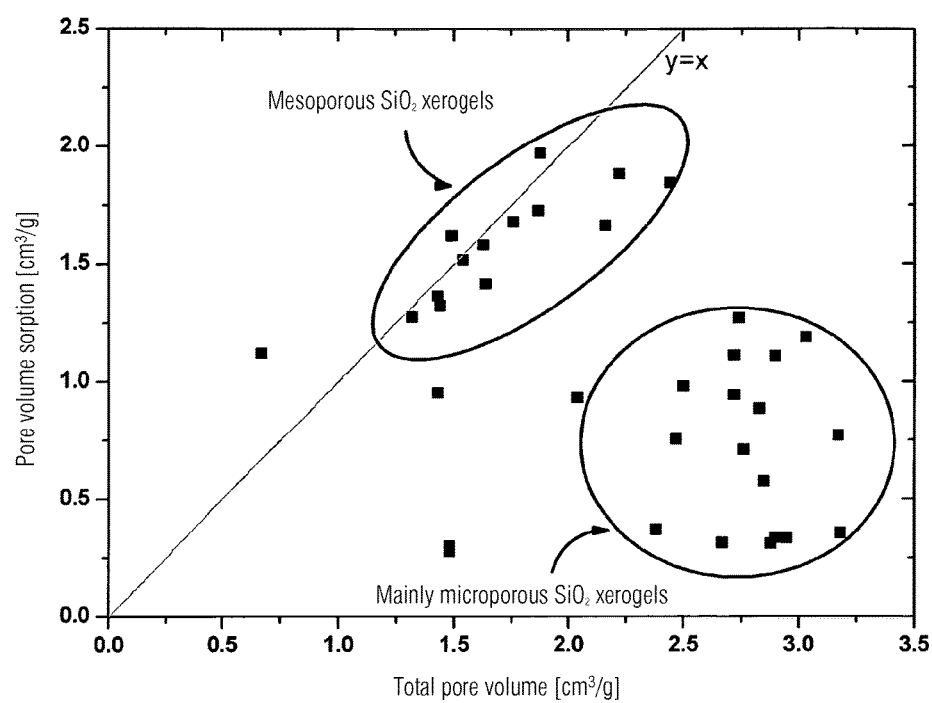
FIG. 4 is a graph showing the relation between pore volume sorption and total pore volume.

Examples of moduli of elasticity and pore diameters of the $SiO_2$ xerogels according to the invention having solid skeletal support are shown in FIG. 3 and FIG. 4.

For all the methods according to the invention, all the components or mixtures thereof which can form polymeric networks in polar protic solvents (preferably mixtures of water and an alcohol, here preferably ethanol) are suitable for the silicate network. Examples are sodium silicate, silicas (pyrogenic silicas such as Aerosil®, precipitated silicas), layered silicates, alkoxysilanes, modified alkoxysilanes. Preferably alkoxysilanes having the general formula Si(OR)$_4$ (where R=organic residue), here preferably tetraethoxysilane (TEOS, Si(OEt)$_4$) and organically modified alkoxysilanes having the general formula R$_n$Si(OR')$_{4-n}$ (where n=0-3; R, R'=organic residues).

For the two bottom-up methods according to the invention, basically all the polymer, polycondensate or polyadduct precursors (=monomers) or copolymer, cocondensate or coadduct precursors which can be networked herein and mixtures therefrom, for example monomers for resorcinol-formaldehyde resins, epoxides, amines, polyesters, polyimides or polyurethanes, which are soluble in polar protic solvents (preferably mixtures of water and an alcohol, here preferably ethanol), are suitable.

By preference, monomers or mixtures thereof are selected which polymerize or condense as a result of setting the pH value and the temperature in the same range as the inorganic network.

In addition to catalysts and, in the case of radical polymerization, radical starters, additives are all the substances which increase the dispersibility or solubility of the organic polymer particles by means of physical or chemical bonds, for example also solubilizers.

Silicon alkoxides having the general formula R$_n$Si(OR')$_{4-n}$ (where n=0-3; R, R'=organic residue) contained in the mixture prevent a demixing of the carbon-containing and silicate phase or form linker groups between the organic particles and the inorganic network.

"Organic polymer precursors or mixtures thereof" thus denotes all the components which are required to form a polymer network in polar protic solvents.

For the two top-down methods according to the invention, basically all particles having diameters of less than 1 micrometer which are dispersible or soluble in polar protic solvents (preferably mixtures of water and an alcohol, here preferably ethanol) and oxidatively removable are suitable. Several examples of organic polymerizates, polycondensates (for example resorcinol-formaldehyde resins) or polyadducts, or copolymers, cocondensates or coadducts are hydrocarbons, epoxides, amines, polyesters, polyimides, polyurethanes but also biopolymers such as for example polysaccharides (flour, rice starch, molasses, sugar beet molasses). Examples of inorganic but oxidatively removable pore fillers are carbons such as carbon blacks (carbon black, conductive carbon black, filler carbon black), carbon nanotubes, fullerenes, and graphite powders.

In addition to catalysts, additives are all the substances which increase the dispersibility or solubility of the organic polymer particles or of the carbon particles by means of physical or chemical bonds, for example also solubilizers.

Silicon alkoxides having the general formula R$_n$Si(OR')$_{4-n}$ (where n=0-3; R, R'=organic residue) contained in the mixture prevent a demixing of the carbon-containing and silicate phase or form linker groups between the organic particles and the inorganic network. "Organic polymers or mixtures thereof" thus denotes all the components which are required to achieve dispersion in polar protic solvents.

With regard to the method according to the invention, silicon compounds, for example silicon alkoxides having the general formula Si(OR)$_4$ or sodium silicate (after separation of the cations by means of an ion exchanger), are converted with water in an acid or base medium either in a dispersion of organic nanoparticles or carbon particles and appropriate additives, or the silicon compounds are converted with water in an acid or base medium, mixed with organic or carbon-particles (diameters of less than 1 micrometer) in the gelification interrupted by ultrasound, and the gelification is subsequently continued. After completion of gelification, the wet gel is dried at 1 bar and the organic phase is subsequently removed by heat treatment in excess of 300° C.

Exemplary Embodiment 1

Resorcinol is dissolved in ethanol and mixed whilst stirring with water, formaldehyde and a 0.1 normal solution of sodium carbonate in water at 50° C., and stirred. After cooling the mixture to 20° C., tetraethoxysilane (TEOS), ethanol, water and a 0.05 mol ammonium hydroxide solution are also added whilst stirring, the mixture is stirred briefly and poured into closed vessels at 30° C. for gelification. On completion of gelification the monolith formed is placed in ethanol for 7 days and subsequently dried at 1 bar ambient pressure and 30° C. The xerogel obtained is then pyrolyzed at 550° C. in an inert gas atmosphere (argon) and subsequently heated at 550° C. and in an oxygenated atmosphere.

Exemplary Embodiment 2

Tetraethoxysilane (TEOS) is mixed with ethanol, water and a 0.05 mol ammonium hydroxide solution and brought to reaction at 20° C. As soon as the solution becomes viscous (start of gelification), the reaction solution is subjected to ultrasound (high intensity) while being mixed with a suspension of carbon black in ethanol. After dispersion of the particles has taken place by way of the reaction mixture, the gelification is continued at 30° C. without stirring in a closed vessel. On completion of gelification the monolith formed is placed in ethanol for 7 days and subsequently dried at 1 bar ambient pressure and 30° C. The xerogel obtained is then pyrolyzed at 550° C. in an inert gas atmosphere (argon) and subsequently heated at 550° C. and in an oxygenated atmosphere.

Exemplary Embodiment 3

Neopentyl glycol diglycidyl ether is converted in ethanol whilst stirring with diethylenetriamine at 50° C. 3-glycidyloxypropyl trimethoxysilane (GLYMO) is subsequently added and the reaction mixture stirred at 50° C. After cooling, water and a 0.05 mol ammonium hydroxide solution are added to the reaction mixture which is stirred further at 20° C. Tetraethoxysilane (TEOS) is then added, with further brief stirring, and the mixture is poured into closed vessels at 30° C. for gelification. On completion of gelification the monolith formed is placed in ethanol for 7 days and subsequently dried at 1 bar ambient pressure and 30° C. The xerogel obtained is then pyrolyzed at 550° C. in an inert gas atmosphere (argon) and subsequently heated at 550° C. and in an oxygenated atmosphere.

Exemplary Embodiment 4

Tetraethoxysilane (TEOS) and a 0.05 mol ammonium hydroxide solution are added to a solution of hydroxypropyl cellulose in an ethanol/water mixture and brought to reaction at 30° C., stirred briefly, and the mixture is poured into closed vessels at 30° C. for gelification. On completion of gelification the monolith formed is placed in ethanol for 7 days and subsequently dried at 1 bar ambient pressure and 30° C. The xerogel obtained is then pyrolyzed at 550° C. in an inert gas atmosphere (argon) and subsequently heated at 550° C. and in an oxygenated atmosphere.

LIST OF REFERENCE CHARACTERS

1 SiO$_2$ structure
2 Organic or carbon component

3 Combustion of organic constituents
4 Preserved pore or imperfection
5 Remaining carbon-containing component

REFERENCES

[WO001998005591A1]
[EP0690023A2]
[DE3346180C2]
[WO2005068361]

The invention claimed is:

1. A non-silylated porous $SiO_2$ xerogel, comprising:
    pyrolyzed carbon residue, the pyrolyzed carbon residue comprising less than 10% by weight of the non-silylated porous $SiO_2$ xerogel;
    the $SiO_2$-xerogel having a density of less than 400 kg/m$^3$, a thermal conductivity at 800° C. below 0.060 W/m*K, a thermal conductivity at 400° C. below 0.040 W/m*K, a thermal conductivity at 200° C. below 0.030 W/m*K, and a plurality of pores, the pores having a pore size from more than 50 nm to less than 1000.

2. The $SiO_2$ xerogel of claim 1, wherein the pores have a pore size of smaller than 500 nm.

3. The $SiO_2$ xerogel of claim 1, wherein the pores have a pore size of smaller than 300 nm.

4. The $SiO_2$ xerogel of claim 1, wherein the pores have a pore size of less than 100 nm.

5. The $SiO_2$ xerogel of claim 1, having a density of less than 290 kg/m$^3$.

6. The $SiO_2$ xerogel of claim 1, having a density of less than 200 kg/m$^3$ and a carbon content of less than 5%.

7. The $SiO_2$ xerogel of claim 1, having a carbon content of less than 5%.

8. The $SiO_2$ xerogel of claim 1, having an IR extinction greater than 50 m$^2$/g in the absence of additional pigments.

9. The $SiO_2$ xerogel of claim 7, having an IR extinction of greater than 80 m$^2$/g in the presence of additional pigments.

10. The $SiO_2$ xerogel of claim 1, wherein the xerogel is a member selected from the group consisting of a monolithic molded body, a granulate, and a powder.

11. The $SiO_2$ xerogel of claim 1, having a fiber content of less than 5% by weight.

12. The $SiO_2$ xerogel of claim 1 for use as a noncombustible or nonflammable, transparent or translucent or opaque thermal insulation, as a thermal insulation offering mechanical support, catalyst support, filter, adsorber, noncombustible or nonflammable, transparent or translucent or opaque lightweight construction element, dielectric for electronic components, as a controlled or rapid drug release system, as a coating allowing utilization of thermodiffusion processes, as a casting mold, as a support for sensor molecules in sensor technology, for sound damping, for humidity control or as a matrix material for composites.

13. The $SiO_2$ xerogel of claim 1, wherein the $SiO_2$ xerogel is exposed to an application temperature in excess of 250° C.

14. A composition comprising:
    a non-silylated porous $SiO_2$ xerogel characterized by a density of less than 400 kg/m$^3$, a thermal conductivity at 800° C. below 0.060 W/m*K, a thermal conductivity at 400° C. below 0.040 W/m*K, a thermal conductivity at 200° C. below 0.030 W/m*K, a modulus of elasticity greater than 5 MPa, and having a plurality of pores, the pores having a pore size from more than 50 nm to less than 1000 nm;
    wherein the non-silylated porous $SiO_2$ xerogel is prepared by a process comprising:
        forming a $SiO_2$ xerogel around solid organic particles;
        drying the $SiO_2$ xerogel using a subcritical drying process; and
        pyrolyzing the $SiO_2$ xerogel at a temperature above 300° C. sufficient to cause the solid organic particles to form a pyrolyzed carbon residue, the pyrolyzed carbon residue comprising less than 10% by weight of the non-silylated porous $SiO_2$ xerogel.

* * * * *